(12) United States Patent
Kong

(10) Patent No.: US 6,757,237 B2
(45) Date of Patent: Jun. 29, 2004

(54) APPARATUS FOR CALIBRATING TILT IN DISC PLAYER

(75) Inventor: Gyeng Y. Kong, Suwon-si (KR)

(73) Assignee: Digital Multimedia Technology Co., Ltd., Kyunggi-do (KR)

(*) Notice: Subject to any disclaimer, the term of this patent is extended or adjusted under 35 U.S.C. 154(b) by 381 days.

(21) Appl. No.: 09/967,660

(22) Filed: Oct. 1, 2001

(65) Prior Publication Data

US 2002/0048244 A1 Apr. 25, 2002

(30) Foreign Application Priority Data

Jan. 15, 2001 (KR) .......................................... 2001-2104

(51) Int. Cl.[7] .............................................. G11B 25/00
(52) U.S. Cl. ...................................... 369/263; 369/258
(58) Field of Search ........................... 369/44.32, 53.14, 369/53.19, 53.3, 47.36, 47.38, 53.42, 53.43, 258, 263

(56) References Cited

U.S. PATENT DOCUMENTS 5,970,035 A * 10/1999 Ohmori et al. ............ 369/53.2
6,172,950 B1 * 1/2001 Tanaka ..................... 369/44.32
6,181,669 B1 * 1/2001 Park ........................... 369/219
6,388,982 B2 * 5/2002 Ogusu ........................ 369/264
6,493,296 B1 * 12/2002 Fukumoto et al. ....... 369/44.32
6,633,532 B1 * 10/2003 Handa ........................ 369/263

FOREIGN PATENT DOCUMENTS

KR 20010002104 1/2001

* cited by examiner

Primary Examiner—Paul W. Huber
(74) Attorney, Agent, or Firm—Park & Sutton LLP; John K. Park

(57) ABSTRACT

An apparatus for calibrating a tilt in a disc player includes a deck base, an optical pickup unit reciprocating in the radial direction of a disc and irradiating optical beams with respect to of the recording surface of the disc, a regulation plate supported on the deck base, a spindle motor secured to the regulation plate, a turntable driven and rotated by the spindle motor, on which the disc is loaded, and a revolving unit for rotating the regulation plate according to the crookedness of the recording surface on the disc. In the disc player tilt calibration apparatus, a cam unit is driven and rotated by a motor which rotates in the forward and reverse directions according to the crooked states on the disc recording surface, to thereby tilt the regulation plate. Accordingly, the tilt of the turntable can be adjusted to resultantly make a regulation work simplified and convenient.

3 Claims, 4 Drawing Sheets

APPARATUS FOR CALIBRATING TILT IN DISC PLAYER

CLAIMING FOREIGN PRIORITY

The applicant claims and requests a foreign priority, through the Paris Convention for the Protection of Industry Property, based on a patent application filed in the Republic of Korea (South Korea) with the filing date of Jan. 15, 2001, with the patent application number 2001-0002104, by the applicant. (See the Attached Declaration)

BACKGROUND OF THE INVENTION

1. Field of the Invention

The present invention relates to a disc player, and more particularly, to an apparatus for calibrating a tilt in a disc player in which a tilt in a disc player can be calibrated even during reproduction according to the crooked state of a recording surface on a disc which is loaded and rotated at high speed on a turntable.

2. Description of the Related Art

In a general disc player, a disc, for example, a compact disc or a digital video disc is loaded on a turntable according to driving of a loading mechanism, and clamped by operation of a clamping unit. Information is recorded on a disc or reproduced from a disc, by driving of an optical pickup unit which reciprocates in the radial direction of the disc and irradiates beams onto recording pits on the disc.

A beam irradiated from an optical pickup unit should be irradiated accurately perpendicular to a recording pit on a disc in order to reproduce or record information from or on the disc. For this reason, the surface on a disc should be plane. However, a disc surface is bent in one direction or twisted in the process of manufacturing or distributing discs.

Thus, in the case that a disc surface is bent in one direction or has a surface of a twisted shape, a recording surface on a disc is crooked. As a result, a tilt occurs between the disc recording surface and the irradiated beam from the pickup unit according to the crooked state of the disc recording surface.

The tilt phenomenon causes an optical axis of the optical pickup unit to be slant with respect to the disc recording surface, and aberration to occur in a focusing beam, with a result that a frequency characteristic of light, in particular, a phase characteristic in this case is degenerated. Accordingly, a reproduction performance is remarkably lowered. Also, in particular, information is not reproduced from a disc of which the crooked state of the disc recording surface is severe.

A tilt calibration apparatus solving the above problems has been disclosed in Korean Utility Model Application No. 1999-22530, in which a guide rod for guiding an optical pickup unit in the radial direction of a disc is calibrated up and down to thereby calibrate a tilt.

However, the above-described tilt calibration apparatus cannot calibrate a tilt during reproduction. Since a surface possessed by paths of a turntable and an optical pickup unit is calibrated in the manufacturing process prior to reproduction of a disc, the tilt calibration apparatus cannot actively cope with crookedness of an individual disc. Also, in the case that a guide rod is calibrated up and down, an optical pickup unit moves askew so that a tilt is calibrated. However, since an overload occurs in a driving source of an optical pickup unit requiring a minute calibration according to a slant degree of a guide rod, a movable performance of an optical pickup unit is lowered, and thus a reproduction characteristic is influenced. Also, a manual work is done to calibrate a tilt, to thereby limit a precise calibration.

SUMMARY OF THE INVENTION

To solve the above problems, it is an object of the present invention to provide a tilt calibration apparatus for use in a disc player in which a slope of a disc is calibrated according to crookedness of the disc even during reproduction of the disc to thereby enhance a reproduction capability, improve a reproduction feature with a simple structure, and reduce a calibration offset between the inner circumference and the outer circumference on the disc.

To accomplish the above object of the present invention, there is provided an apparatus for calibrating a tilt in a disc player comprising: a deck base; an optical pickup unit reciprocating in the radial direction of a disc and irradiating optical beams with respect to of the recording surface of the disc; a regulation plate supported on the deck base; a spindle motor secured to the regulation plate; a turntable driven and rotated by the spindle motor, on which the disc is loaded; and a revolving unit for rotating the regulation plate according to the crookedness of the recording surface on the disc.

The revolving unit comprises: a motor driving signal generator for generating a motor driving signal according to the crookedness of the disc recording surface; a motor which rotates forwardly or backwardly according to the motor driving signal; and a cam unit which is rotatably coupled to the deck base according to the forward rotation or backward rotation of the motor, for ascending or descending the regulation plate in which the edge of the regulation plate slidingly contacts the cam unit.

The regulation plate comprises a horizontal portion to which the spindle motor is secured and a vertical portion extended from the horizontal portion in which the horizontal portion in the regulation plate is secured to the deck base in both sides of the spindle motor by means of first and second fixing screws, respectively and a regulation hole is formed in the vertical portion, a regulation screw which penetrates through the bottom of the deck base and connects the regulation hole, and a spring which elastically biases the vertical portion of the regulation plate downwards from the deck base.

In the disc player tilt calibration apparatus according to the present invention, a cam unit is driven and rotated by a motor which rotates in the forward and reverse directions according to the crooked states on the disc recording surface, to thereby tilt the regulation plate. Accordingly, the tilt of the turntable can be adjusted and a tilt can be calibrated even during reproducing a disc, to thereby improve a reproduction capability.

BRIEF DESCRIPTION OF THE DRAWINGS

The above object and other advantages of the present invention will become more apparent by describing the preferred embodiments thereof in more detail with reference to the accompanying drawings in which.

DETAILED DESCRIPTION OF THE INVENTION

Figure 1:
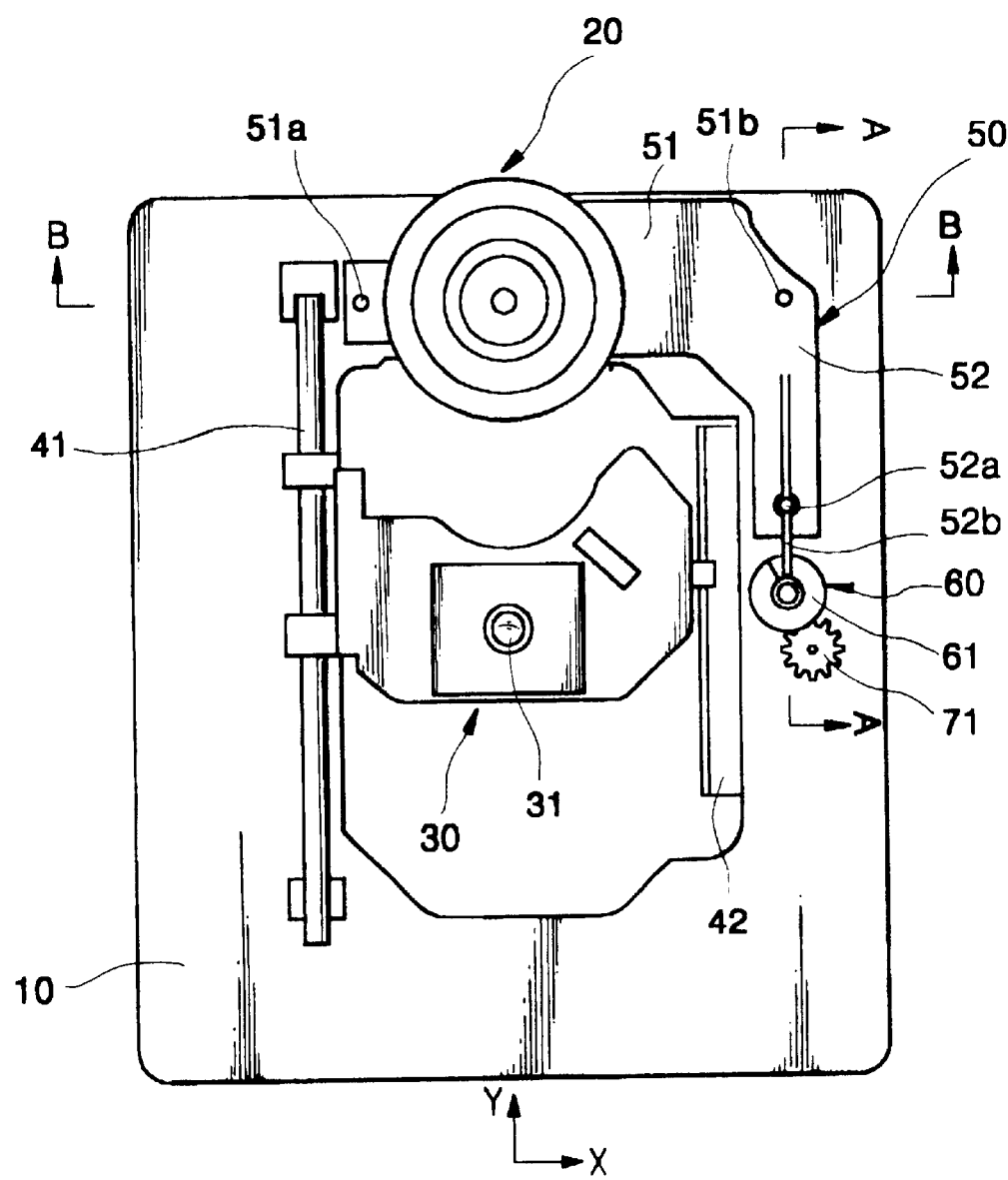
FIG. 1 is a top plan view showing a disc player adopting a tilt calibration apparatus according to the present invention.

A preferred embodiment of the present invention will be described with reference to the accompanying drawings.

A tilt calibration apparatus for use in a disc player includes a deck base 10, an optical pickup unit 30 reciprocating in the radial direction of a disc 1 and irradiating optical beams with respect to of the recording surface of the disc 1, a regulation plate 50 supported on the deck base 10, a spindle motor 80 secured to the regulation plate 50, a turntable 20 driven and rotated by the spindle motor 80, on which the disc 1 is loaded, and a revolving unit 100 for rotating the regulation plate 50 according to the crookedness of the recording surface on the disc 1.

The revolving unit 100 includes a motor driving signal generator 72 for generating a motor driving signal MD according to the crookedness of the recording surface on the disc 1, a motor 70 which rotates forwardly or backwardly according to the motor driving signal MD, and a cam unit 60 which is rotatably coupled to the deck base 10 according to the forward rotation or backward rotation of the motor 70, for ascending or descending the regulation plate 50 in which the edge of the regulation plate 50 slidingly contacts the cam unit 60.

The cam unit 60 includes a spiral slant cam 61 which an edge 52b of a vertical portion 52 in the regulation plate 50 slidingly contacts, and a cam gear 71 installed in the same axis as that of the spiral slant cam 61 and connected with the motor 70.

The regulation plate 50 includes a horizontal portion 51 to which the spindle motor 80 is secured and the vertical portion 52 extended from the horizontal portion 51 in which the horizontal portion 51 in the regulation plate 50 is secured to the deck base 10 in both sides of the spindle motor 80 by means of first and second fixing screws 55 and 56, respectively and a regulation hole 52a is formed in the vertical portion 52, a regulation screw 57 which penetrates through the bottom of the deck base 10 and connects the regulation hole 52a, and a spring 58 which elastically biases the vertical portion 52 of the regulation plate 50 downwards from the deck base 10.

A plate spring 90 is provided between the deck base 10 and the regulation plate 50, to thereby elastically bias the regulation plate 50 upwards.

An operation of the tilt calibration apparatus for use in a disc player according to the present invention having the above-described structure will be described below with reference to the accompanying drawings.

Figure 2:
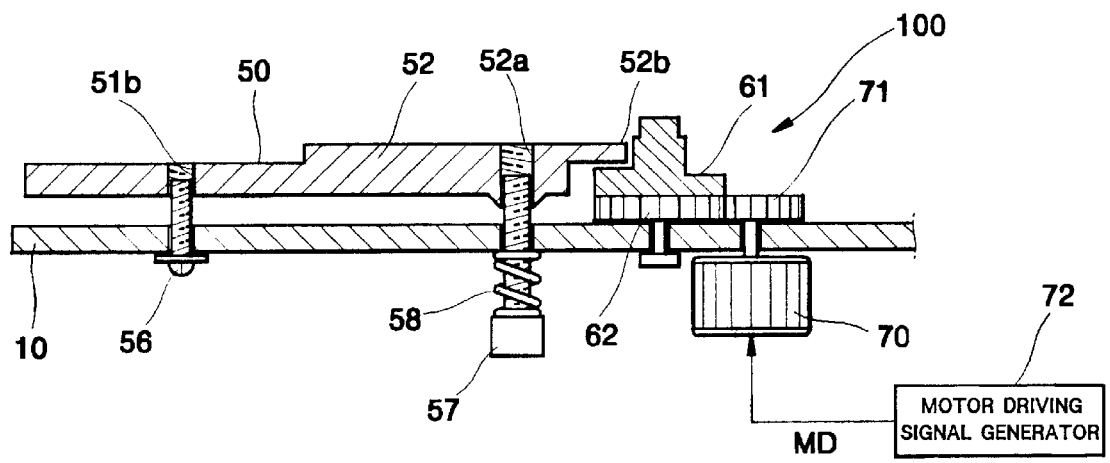
FIG. 2 is a sectional view cut along a line A—A of FIG. 1.
Figure 3:
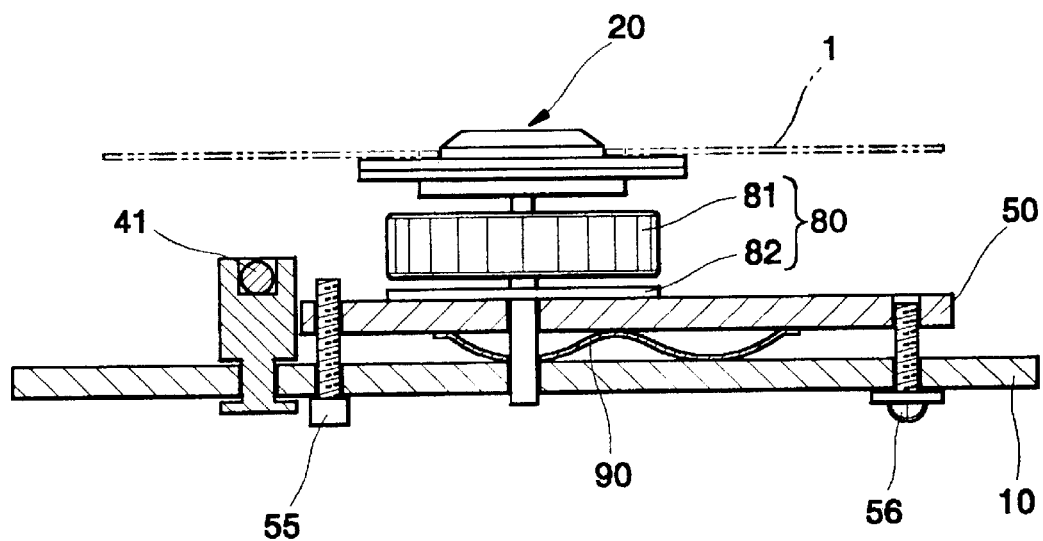
FIG. 3 is a sectional view cut along a line B—B of FIG. 1.

Referring to FIGS. 1 through 3 showing the essential elements of the disc player adopting the tilt calibration apparatus according to the present invention, a disc 1 is loaded on a turntable 20 according to driving of a loading mechanism (not shown), and clamped by operation of a clamping unit (not shown). Information is recorded on the disc 1 or reproduced from the disc 1, by driving of an optical pickup unit 30 which reciprocates in the radial direction of the disc 1 and irradiates beams onto recording pits on the disc 1.

An objective lens 31 for irradiating optical beams onto recording pits is mounted on the optical pickup unit 30. The objective lens 31 moves minutely up and down and to the left and to the right due to error corrections by means of a focusing servo and a tracking servo.

Also, the optical pickup unit 30 is slidingly movably supported by a guide shaft 41 and a guide rib 42, so as to be moved and guided in the radial direction of the disc 1. The optical pickup unit 30 is reciprocated by a driving source (not shown).

Meanwhile, in the tilt calibration apparatus for use in a disc player according to the present invention as shown in FIG. 1, a regulation plate 50 is minutely rotatably supported on a deck base 10. A spindle motor 80 including a stator 82 and a rotor 81 is provided on the regulation plate 50. A turntable 20 on which a disc 1 is loaded is provided on the axis of the spindle motor 80. The regulation plate 50 is minutely rotated by a revolving unit 100 according to crooked states of the recording surface on a disc 1, to thereby enable a tilt of the turntable 20 to be regulated.

The regulation plate 50 includes a horizontal portion 51 to which the spindle motor 80 is secured and a vertical portion 52 extended from the horizontal portion 51, to thereby reduce a calibration offset between the inner circumference and the outer circumference on the disc. The horizontal portion 51 in the regulation plate 50 is secured to the deck base 10 in both sides of the spindle motor 80 by means of first and second fixing screws 55 and 56, respectively and a regulation hole 52a is formed in the vertical portion 52.

As shown in FIG. 2, a regulation screw 57 penetrates through the bottom of the deck base 10 and connects the regulation hole 52a, and a spring 58 elastically biases the vertical portion 52 of the regulation plate 50 downwards from the deck base 10 between the deck base 10 and the head of the regulation screw 57.

Figure 4:
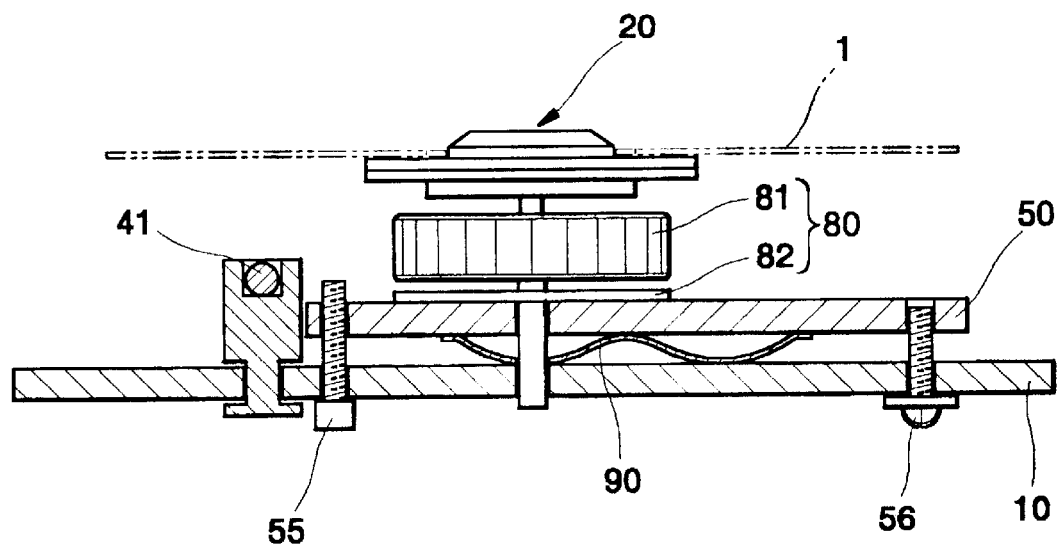
FIG. 4 is a perspective view showing a cam driving portion.

As shown in FIGS. 2 and 4, the revolving unit 100 includes a motor driving signal generator 72 for generating a motor driving signal MD according to the crookedness of the recording surface on the disc 1, a motor 70 which rotates forwardly or backwardly according to the motor driving signal MD, and a cam unit 60 which is rotatably coupled to the deck base 10 according to the forward rotation or backward rotation of the motor 70, for ascending or descending the regulation plate 50 in which the edge of the regulation plate 50 slidingly contacts the cam unit 60. A following pin 52b at the edge of the vertical portion 52 in the regulation plate 50 is interlocked with the cam unit 60 which rotates by means of the motor 70.

The cam unit 60 includes a spiral slant cam 61 which an edge following pin 52b of the vertical portion 52 in the regulation plate 50 slidingly contacts, and a cam gear 71 installed on the same axis as that of the spiral slant cam 61 and connected with the motor 70.

A plate spring 90 is provided between the deck base 10 and the regulation plate 50, to thereby elastically bias the regulation plate 50 upwards.

As shown in FIGS. 2 and 4, in the tilt calibration apparatus according to the present invention, a spiral slant cam 61 is rotated by the motor 70 which rotates in the forward and reverse directions according to the crooked states on the disc recording surface output from a motor driving signal generator 72. The vertical portion 52 in the regulation plate 50 interlocking the spiral slant cam 61 ascends or descends. The vertical portion 52 in regulation plate 50 is prevented from a spring-back by the spring 58, to thereby maintain a stable rotational state.

Here, since the horizontal portion 51 in the regulation plate 50 is supported on the deck base 10 by means of the first and second fixing screws 55 and 56 and the plate spring 90, the first fixing screw 55 is made to rotate to calibrate a tilt of an X-direction, when intending to calibrate a tilt in the X-direction of FIG. 1. Also, when the first fixing screw 55 is rotated around the second fixing screw 56, the connecting line between the first and second fixing screws 55 and 56 passes through the center of the turntable 20 and forms a right angle with respect to the spiral slant cam 61, to thereby calibrate a tilt independently in the X- and Y-directions. As a result, a mutual interference occurring when a tilt is calibrated in the X- and Y-directions can be prevented.

Figure 5A:
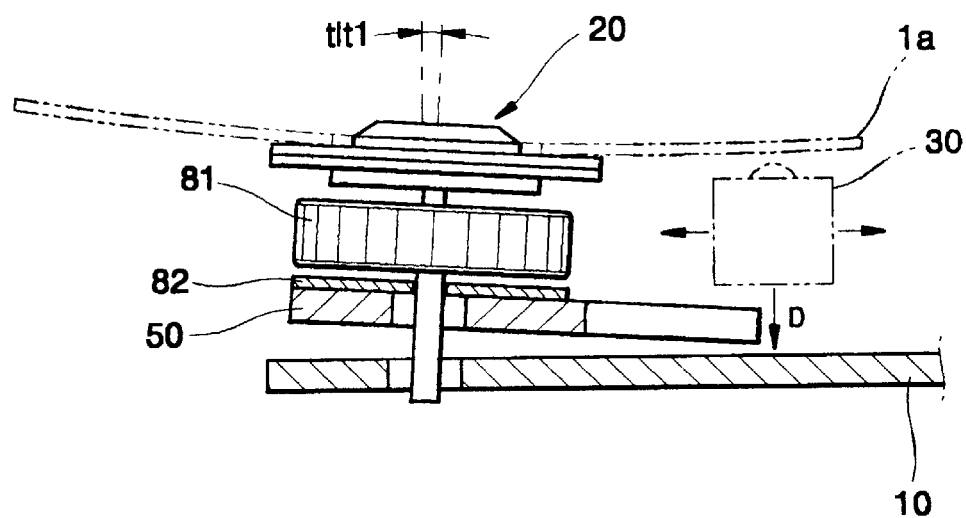
FIGS. 5A and 5B schematically illustrate a tilt calibration state of a disc, respectively.
Figure 5B:
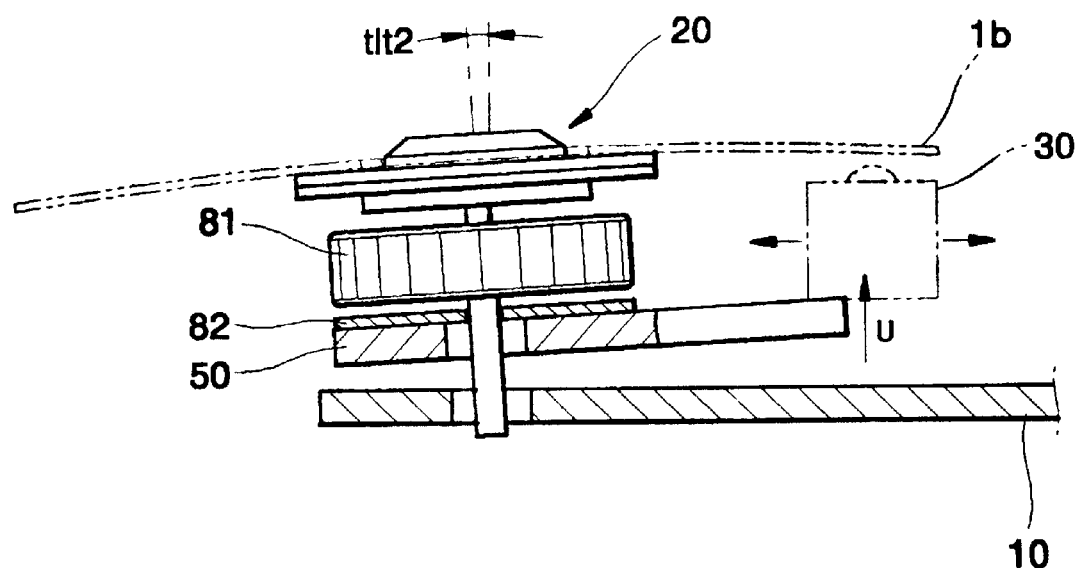

FIGS. 5A and 5B schematically illustrate a tilt calibration state of a disc, respectively.

As shown in FIG. 5A, in the case that a disc 1a loaded in the turntable 20 is bent upwards, the motor driving signal generator 72 outputs a motor driving signal MD for forwardly rotating the motor 70 which is determined according to the upward bent degree of the disc 1a for example. The motor 70 rotates forwardly for a predetermined time by the motor driving signal MD and thus the cam gear 71 and the spiral slant cam 61 rotate. The vertical portion 52 in the regulation plate 50 descends downwards "D" by the spiral slant cam 61. The horizontal portion 51 ascends upwards by the descending of the vertical portion 52 in the regulation plate 50. Accordingly, the spindle motor 80 and the turntable 20 become slanted to have the same angle tlt1 as the bent angle of the recording surface on the disc 1a. Thus, a tilt is calibrated so that the recording surface on the disc 1a loaded on the turntable 20 is perpendicular to the optically axial direction, in order to accurately vertically irradiate the beams irradiated from the optical pickup unit 30 onto the recording pits on the disc.

As shown in FIG. 5B, in the case that a disc 1b loaded in the turntable 20 is bent downwards, the motor 70 rotates backwardly for a predetermined time by the motor driving signal MD output from the motor driving signal generator 72, for reversely rotating the motor 70 and thus the cam gear 71 and the spiral slant cam 61 rotate, in the same manner as the above-described FIG. 5A case. The vertical portion 52 in the regulation plate 50 ascends upwards "U" by the spiral slant cam 61. The horizontal portion 51 descends downwards by the ascending of the vertical portion 52 in the regulation plate 50. Accordingly, the spindle motor 80 and the turntable 20 become slanted to have the same angle tlt2 as the bent angle of the recording surface on the disc 1b. Thus, a tilt is calibrated so that the recording surface on the disc 1b loaded on the turntable 20 is perpendicular to the optically axial direction, in order to accurately vertically irradiate the beams irradiated from the optical pickup unit 30 onto the recording pits on the disc. Here, the horizontal portion 51 is elastically biased upwards by means of the plate spring 90 to thereby maintain a stable tilt calibration state.

In the tilt calibration apparatus according to the present invention, a cam unit is rotated by a motor which rotates in the forward and reverse directions according to the crooked states on a disc, to thereby tilt the regulation plate.

Accordingly, the tilt of the turntable can be adjusted even during reproduction of the disc. Also, since a tilt is calibrated only in the X-direction, a tilt calibration is simplified and a mutual interference which can occur when a tilt is calibrated in the X- and Y-directions is prevented, to thereby improve a reproduction capability of a disc.

What is claimed is:

1. An apparatus for calibrating a tilt in a disc player, the tilt calibration apparatus comprising:

a deck base;

an optical pickup unit reciprocating in the radial direction of a disc and irradiating optical beams with respect to of the recording surface of the disc;

a regulation plate supported on the deck base;

a spindle motor secured to the regulation plate;

a turntable driven and rotated by the spindle motor, on which the disc is loaded; and a revolving unit for rotating the regulation plate according to the crookedness of the recording surface on the disc, wherein said revolving unit comprises;

i) a motor driving signal generator for generating a motor driving signal according to the crookedness of the disc recording surface:

ii) a motor which rotates forwardly or backwardly according to the motor driving signal; and iii) a cam unit which is rotatably coupled to the deck base according to the forward rotation or backward rotation of the motor, for ascending or descending the regulation plate in which the edge of the regulation plate slidingly contacts the cam unit, wherein said cam unit comprises a spiral slant cam which an edge of a vertical portion in the regulation plate slidingly contacts, and a cam gear installed in the same axis as that of the spiral slant cam and connected with the motor.

2. The tilt calibration apparatus of claim 1, wherein said regulation plate comprises: a horizontal portion to which the spindle motor is secured and a vertical portion extended from the horizontal portion in which the horizontal portion in the regulation plate is secured to the deck base in both sides of the spindle motor by means of first and second fixing screws, respectively and a regulation hole is formed in the vertical portion; a regulation screw which penetrates through the bottom of the deck base and connects the regulation hole; and a spring which elastically biases the vertical portion of the regulation plate downwards from the deck base.

3. The tilt calibration apparatus of claim 1, wherein a plate spring is provided between the deck base and the regulation plate, to thereby elastically bias the regulation plate upwards.

* * * * *